United States Patent
Ghezzi et al.

(10) Patent No.: US 12,455,174 B2
(45) Date of Patent: Oct. 28, 2025

(54) SENSOR WITH ANALOG OUTPUT AND SENSOR SYSTEM

(71) Applicant: Melexis Technologies SA, Bevaix (CH)

(72) Inventors: Cesare Ghezzi, Bevaix (CH); Zsombor Lazar, Bevaix (CH); Lionel Tombez, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 418 days.

(21) Appl. No.: 18/056,780

(22) Filed: Nov. 18, 2022

(65) Prior Publication Data
US 2023/0152124 A1 May 18, 2023

(30) Foreign Application Priority Data
Nov. 18, 2021 (EP) .................................. 21209158

(51) Int. Cl.
*G01D 1/14* (2006.01)
*G01D 1/08* (2006.01)

(52) U.S. Cl.
CPC ............... *G01D 1/14* (2013.01); *G01D 1/08* (2013.01)

(58) Field of Classification Search
CPC .. G01D 1/14; G01D 1/08; G01D 5/12; G01D 21/02
See application file for complete search history.

(56) References Cited

U.S. PATENT DOCUMENTS

| | | | | |
|---|---|---|---|---|
| 9,959,128 | B2* | 5/2018 | Bodner | G06F 13/364 |
| 10,133,690 | B2* | 11/2018 | Solbach | G06F 3/0656 |
| 10,698,388 | B2 | 6/2020 | Ishikawa et al. | |
| 2004/0263351 | A1 | 12/2004 | Joy et al. | |
| 2015/0316592 | A1 | 11/2015 | Minezawa et al. | |
| 2020/0089214 | A1* | 3/2020 | Cella | H04Q 9/00 |
| 2020/0128615 | A1 | 4/2020 | Bonnett et al. | |

FOREIGN PATENT DOCUMENTS

| | | | | |
|---|---|---|---|---|
| CN | 1667998 A | * | 9/2005 | ........... H04L 1/0045 |
| DE | 102014101754 A1 | * | 8/2015 | ............. G08C 17/02 |

OTHER PUBLICATIONS

Search Report from corresponding European Application No. 21209158.1, Apr. 28, 2022.

* cited by examiner

*Primary Examiner* — Octavia Hollington
(74) *Attorney, Agent, or Firm* — Workman Nydegger (57) ABSTRACT

A sensor including at least one sensor element configured for measuring an external parameter and outputting one or more results representative for the external parameter, an output buffer configured for receiving the one or more results or a processed version thereof and for applying an analog signal representative for the result or a time multiplexed sequence of analog signals representative for the results on a sensor terminal, and a control circuit configured for obtaining an ID of the sensor, and for receiving a trigger signal, and for determining whether the trigger signal matches the ID of the sensor, and for enabling the output buffer during a pre-defined period when the trigger signal matches the ID of the sensor.

15 Claims, 5 Drawing Sheets

SENSOR WITH ANALOG OUTPUT AND SENSOR SYSTEM

FIELD OF THE INVENTION

The invention relates to the field of sensors. More specifically it relates to a sensor with analog output and to a sensor system comprising a plurality of such sensors.

BACKGROUND OF THE INVENTION

In automotive applications a plurality of sensors are needed for measuring a plurality of external parameters. In electronics in general, and more specific in automotive applications there is a constant need for optimizing the electronics in terms of complexity, cost, and safety. In order to simplify the wiring needed, these sensors typically transmit there data over a digital bus. An example thereof is given in the paragraphs below.

In a sensor system different sensors may be put in parallel in order to be able to do a plurality of measurements of external parameters. These external parameters may be the same or they may be different from each other.

The measured information is typically transmitted via a digital bus to a central system. In automotive applications such a system is typically referred to as an electronic control unit. A master electronic control unit (ECU) will receive the measured data from the different sensors.

In such a sensor system multiple slaves (digital sensors) are connected to the same digital bus. In order to obtain information the ECU transmits a read command over the digital bus thereby addressing one of the digital sensors.

At the sensor side, all sensors carry out a conversion operation. Thereby they measure an external parameter such as a physical quantity and convert it to a digital value. When a sensor receives a read command from the ECU the sensor will transmit the obtained digital value over the same digital bus.

Even though such a sensor system comprising a digital bus over which sensor data is communicated is already an improvement in terms of wiring reduction, there is still a need for reducing the complexity of sensors and sensor systems comprising these sensors.

SUMMARY OF THE INVENTION

It is an object of embodiments of the present invention to provide good sensors and sensor systems comprising a plurality of such sensors.

In a first aspect embodiments of the present invention relate to a sensor. The sensor comprises at least one sensor element configured for measuring an external parameter and outputting one or more results representative for the external parameter. The sensor comprises an output buffer which is configured for receiving the one or more results or a processed version thereof and for applying an analog signal representative for the result, or in case there is more than one result, a time multiplexed sequence of analog signals representative for the results, on a sensor terminal. The sensor, moreover, comprises a control circuit which is configured for obtaining an ID of the sensor (e.g. from internal memory), and for receiving a trigger signal (e.g. from an external controller which applies the trigger signal on the sensor terminal or on a power supply terminal). The control circuit is configured for determining whether the trigger signal matches the ID of the sensor, and for enabling the output buffer during a predefined period when the trigger signal matches the ID of the sensor.

It is an advantage of embodiments of the present invention that the sensor terminals of a plurality of sensors with a different ID can be connected together without having conflicting analog output buffers. This is achieved by enabling the output buffer during a predefined period when the trigger signal matches the ID of the sensor.

In embodiments of the present invention the control circuit is configured for determining whether the trigger signal matches the ID of the sensor by comparing a duration of the trigger signal with the ID.

In embodiments of the present invention the control circuit is configured for determining whether the trigger signal matches the ID of the sensor by comparing a number of pulses of the trigger signal with the ID.

In embodiments of the present invention the control circuit is configured for determining whether the trigger signal matches the ID of the sensor by counting the trigger signals thus obtaining a count number and by comparing the count number with the ID.

In embodiments of the present invention the sensor comprises a signal processing circuit which is configured for analog processing the result of the sensor element before directly or indirectly passing it to the output buffer.

In embodiments of the present invention the control circuit is configured for enabling the signal processing circuit when the trigger signal matches the ID of the sensor. In embodiments of the present invention all sensors may be triggered to carry out a measurement before checking if the ID matches. In that case each sensor is configured for enabling the signal processing circuit when the trigger signal is received.

In embodiments of the present invention the control circuit is configured for triggering the sensor element for measuring the external parameter when the trigger signal is receive and/or when the trigger signal matches the ID of the sensor.

In embodiments of the present invention the sensor comprises a digital to analog converter, and an analog to digital converter. In such embodiments the analog to digital converter may be configured for digitizing the result of the sensor element and for passing the digitized result to the control circuit. The control circuit may be configured for processing the digitized result and for passing the processed digitized result to the digital to analog converter of which the output is directly or indirectly connected with the output buffer.

In embodiments of the present invention the control circuit is configured for obtaining the trigger signal from the sensor terminal.

In embodiments of the present invention the sensor comprises power supply terminals for connecting a power supply for powering the sensor.

In embodiments of the present invention the control circuit is configured for obtaining the trigger signal from one or from both of the power supply terminals.

In a second aspect embodiments of the present invention relate to a sensor system which comprises a plurality of sensors according to embodiments of the present invention.

The sensor system, moreover, comprises an electronic control unit, a trigger circuit electrically connected with the control circuits of the plurality of sensors.

The sensor system, moreover, comprises an analog input electrically connected with the output buffers of the plurality of sensors.

The trigger circuit is configured for generating a trigger signal for one or more sensors of the plurality of sensors. The analog input is configured for receiving an analog signal from the output buffers of the sensors, wherein the analog signal is applied by the sensor for which the trigger signal matches the ID of the sensor and wherein the output buffers are electrically connected together.

In a sensor system according to embodiments of the present invention no two sensors will output the measurement result simultaneously.

In embodiments of the present invention the electronic control unit comprises power supply terminals for powering the electronic control unit.

In embodiments of the present invention the trigger circuit and the analog input are connected with the control circuits and with the output buffers using a shared electrical connection.

In embodiments of the present invention the trigger circuit is electrically connected with the one or two power supply terminals of the electronic control unit, and the one or two power supply terminals of the electronic control unit are electrically connected with the power supply terminals of the sensors such that the trigger signal can be transmitted from the trigger circuit to the sensors.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a sensor 110 which comprises at least one sensor element 111 configured for measuring an external parameter. A sensor according to embodiments of the present invention is an analog sensor, meaning that it has at least one analog output 114 (i.e. at least one sensor terminal 114 on which an analog signal is applied) for outputting the measured external parameter.

The at least one sensor element is configured for outputting one or more results representative for the external parameter. The sensor element may for example be configured for measuring a pressure, a temperature, or a magnetic field. The result representative for the external parameter may be a quantity directly derived from the physical parameter, but not the physical parameter itself. For example, the result may be indicative for a position of a target, for example a rotation angle of a magnet or a linear position of a magnet, in stead of the magnetic field strength. The obtained result may be representative for the magnetic field strength and may be derived/calculated from a magnetic field measured by the sensor element. In embodiments of the present invention the result may be an analog output signal. In embodiments of the present invention the result may be representative for an electrical current.

A sensor 110 according to embodiments of the present invention comprises power supply terminals 115, 116 for connecting a power supply for powering the sensor.

A sensor according to embodiments of the present invention comprises an output buffer 113 configured for receiving one or more results, or a processed version of these results, from the at least one sensor element, and for applying an analog signal representative for the result or a time multiplexed sequence of analog signals representative for the results, on the at least one sensor terminal 114. The analog signal which is applied on the sensor terminal may be a DC signal of which the voltage or current is representative for the measured external parameter. In case a sequence of different measurement results needs to be transmitted, a time multiplexed sequence of analog signals is applied on the sensor terminal. The resulting signal may be a DC signal of which the voltage or current is varying in function of the measured external parameter.

Where in embodiments of the present invention reference is made to an output buffer, reference is made to an electronic circuit which is configured to transfer an analog signal from internal circuitry of the sensor to an external circuit The output buffer decouples and/or protects the internal circuitry of the sensor from the external circuit (e.g. the ECU). This is done by providing an impedance transformation between the internal circuit and the external circuit.

In embodiments of the present invention the output buffer may be an analog output buffer. Compared to a digital output buffer, an analog output buffer typically has a more linear input-to-output transfer characteristic.

In embodiments of the present invention the output buffer may have a unity gain (i.e. a gain substantially equal to 1). The output buffer may be a voltage follower or a current follower.

In embodiments of the present invention the output buffer may also be referred to as the buffer amplifier. In embodiments of the present invention the gain may for example be comprised between 0.1 and 20, or 0.5 and 10, or 0.5 and 5, or 0.5 and 2.

An output buffer typically has a high input impedance and a low output impedance, meaning that it can drive higher currents that the internal circuits connected upstream in the chip, such as to maintain the output level. A sensor 110 according to embodiments of the present invention comprises a control circuit 112 configured for obtaining an identification (also referred to as ID, this may for example be an identification number, it relates the sensor to a specific trigger signal such as for example a pattern of the trigger signal) of the sensor. The ID may be hardcoded in the sensor (which may be implemented as a chip), or programmed (it may for example be obtained from memory) or it may be determined based on external components (e.g. a resistor, or one or more pins connected to VDD/GND/floating).

The control circuit 112 is configured for receiving a trigger signal and for determining whether the trigger signal matches with the ID of the sensor. If the trigger signal matches with the ID of the sensor, the control circuit will enable the output buffer 113 during a predefined period.

This allows to connect different sensor terminals of different sensors together on a same wire to a central control unit (e.g. the electronic control unit of a car). Connecting analog sensor terminals together is unusual as it typically would result in conflicting output buffers.

In embodiments of the present invention this is achieved by enabling the output buffer during a predefined period after receiving a trigger signal which matches with the ID of the sensor. In embodiments of the present invention the output buffer of the sensor is in high impedance mode (high-Z mode) outside this predefined period. This may be achieved in various ways amongst which some examples are given below.

In embodiments of the present invention the output buffer may be a push-pull amplifier, e.g. a class B, or class AB amplifier. For example the push-pull amplifier may comprise a pair for complementary MOSFETs (NMOS and PMOS). The output node can be disabled, i.e. set to high-impedance (floating), by blocking the two transistors. This can done by connecting the gate of the NMOS to GND and the gate of the PMOS to VDD (using additional switches, for example). In such a case the output node of the buffer is isolated and the buffer doesn't drive the line.

In embodiments of the present invention the output buffer may comprise an additional transistor (e.g. a MOSFET) acting like a switch at the output stage of the output buffer. The switch may for example be connected with its source and drain in series between the output of a buffer amplifier of the output buffer and the output terminal of the output buffer. A control signal on the gate of the switch can disconnect the output of the switch from the output terminal.

In a second aspect, embodiments of the present invention relate to a sensor system comprising a plurality of sensors and an electronic control unit 120. The electronic control unit comprises power supply terminals 125, 126, a trigger circuit 123, and an analog input 121.

The trigger circuit 123 is electrically connected with the control circuits 112 of the plurality of sensors 110. The analog input is electrically connected with the output buffers 113 of the plurality of sensors. The trigger circuit is configured for triggering the sensors for outputting there results such that only one output buffer is active at a time.

The analog input 121 of the ECU is configured for receiving an analog signal from the output buffers 113 of the sensors 110. All these output buffers are connected together. In embodiments of the present invention this is possible because only one output buffer is enabled at a time. Therefore, in embodiments of the present invention, the analog signal is only applied to the sensor terminal of the sensor for which the trigger signal matches the ID of the sensor.

In embodiments of the present invention the plurality of sensors may be sequentially addressed by the ECU. This is, however, not strictly required. The ECU can decide to address any sensor whenever the ECU wants as long as no two sensors will enable their output buffer simultaneously as a consequence of the addressing. The sequence at which the sensors are addressed may be a repetitive sequence, however, this is also not strictly required. Neither is it required that the ECU addresses all sensors on the bus. It could address multiple times one same sensor, then another, etc. Also, the periodicity does not need to be constant.

In embodiments of the present invention the trigger circuit may be a modulator which is configured for modulating a signal that is received by the control circuits of the sensors. The trigger circuit may comprise a regulator. Circuitry such as a digital to analog convertor may change the reference of the regulator, or may directly modulate the output.

In embodiments of the present invention the analog outputs of the sensors are connected together with the digital output that provides the trigger signal in which the ID is encoded. In such embodiments the trigger circuit 123 and the analog input 121 of the ECU are connected with the control circuits 112 of the sensors and with the output buffers 113 of the sensors using a shared electrical connection.

The analog input 121 of the ECU is configured to acquire the sensed physical quantity or sequence of sensed physical quantities. The analog input may for example comprise an analog to digital converter.

Figure 1:
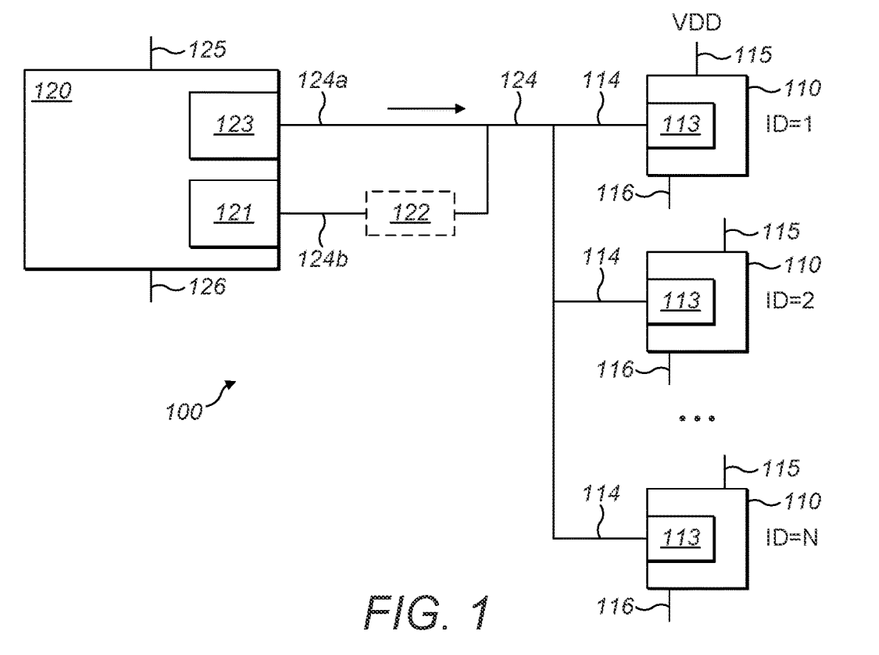
FIG. 1 shows a schematic drawing of a sensor system in accordance with embodiments of the present invention wherein the trigger signals are received on the sensor terminals.

An example of a sensor system 100 according to embodiments of the present invention is schematically illustrated in FIG. 1. In this example the trigger circuit 123 of the ECU 120 is electrically connected via an output terminal 124*a* and sensor terminal 114 to the control circuit 112. The control circuit 112 is not shown in this figure in order not to overload the figure. In the exemplary schematic sensor drawings in FIG. 7 and FIG. 8 the control circuit 112 is drawn. In the example of FIG. 1 the analog input 121 of the ECU 120 is electrically connected via an input terminal 124*b* and sensor terminal 114 with the output buffers 113. In this example all sensor terminals are connected together to a same node which is electrically connected to the node 124. A connection is made between the node 124 and the output terminal 124*a* and between the node 124 and the input terminal 124*b*. Optionally the electrical connection between the node 124 and the input terminal 124*b* may comprise a filter. This filter may filter out noise, it may also filter out the digital signal such that only the analog signal is received at the input terminal 124*b*.

Each sensor 110 has a different ID.

The sensors are powered using power supply terminals 115, 116 and the ECU is powered via power supply terminals 125, 126.

Figure 2:
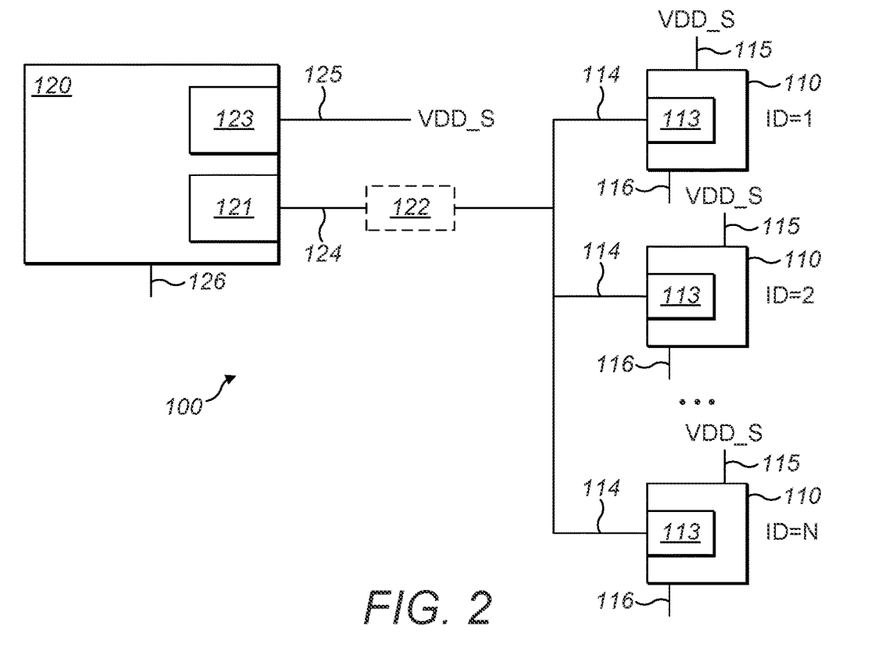
FIG. 2 shows a schematic drawing of a sensor system in accordance with embodiments of the present invention wherein the trigger signals are received on the power terminals.

Another example of a sensor system 100 in accordance with embodiments of the present invention is illustrated in FIG. 2. Differently from the example in FIG. 1, in FIG. 2 the trigger signal is applied to a power supply terminal 125 of the ECU 120. The trigger signal can be an under- or over-voltage or a sequence of under- and/or over-voltages. It may have a specific pattern which can be a combination of timing and/or amplitude and/or polarity of the trigger signal. The power supply VDD_S is also applied to the sensors 110. In this exemplary embodiment of the present invention the power supply terminal 125 of the ECU is connected with the power supply terminals 115 of the sensors 110. The control circuits of the sensors 110 are in this case configured for obtaining the trigger signal from the power supply terminal 115.

Figure 3:
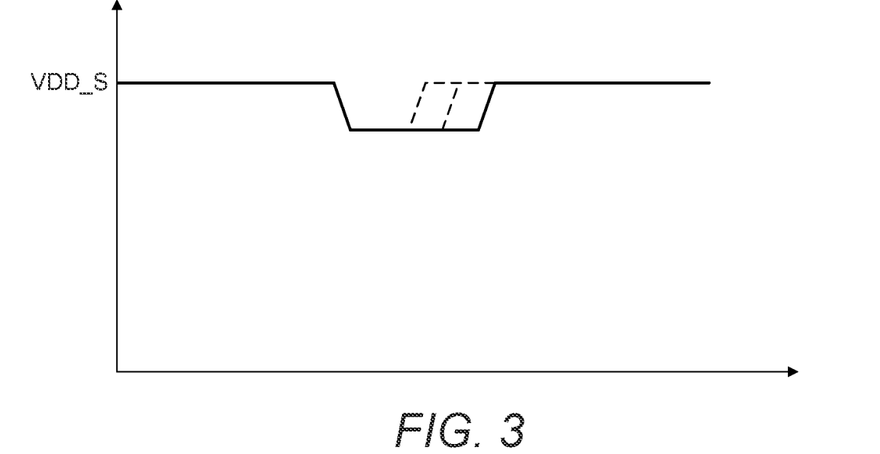
FIG. 3 shows a power supply voltage modulated with a trigger signal, in accordance with embodiments of the present invention.

An example of a supply voltage VDD_S in function of time which is modulated by a trigger signal is illustrated in FIG. 3. In this example the duration of the trigger signal is used for matching the trigger signal with an ID of the sensor. The dashed lines are drawn to show trigger signals with a different duration.

Besides using the duration of the trigger signal for matching the trigger signal with an ID of the sensor, matching may also be done based on other trigger signal characteristics. For example, the number of pulses within a trigger signal may be used for matching the trigger signal with an ID. The control circuit may also count the number of trigger signals which it receives. A count number may thereby correspond with a ID. The matching between trigger signal and ID should be such that no two sensors can enable their output buffers simultaneously.

Figure 4:
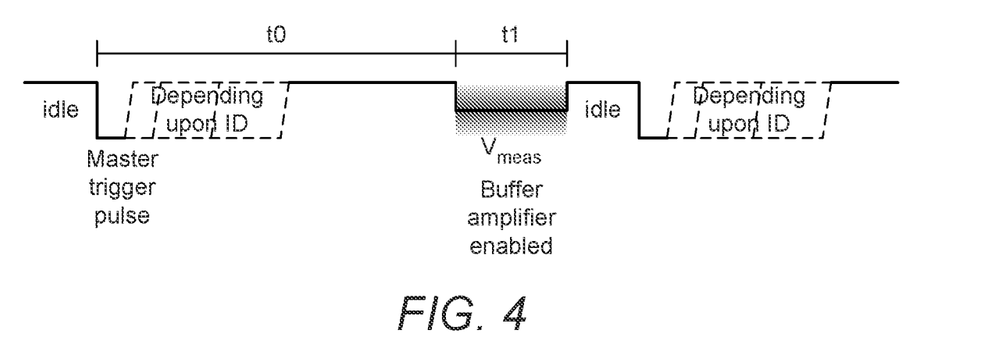
FIG. 4 shows a timing diagram comprising a digital trigger signal comprising an ID and a subsequent analog signal from the sensor with matching ID, in accordance with embodiments of the present invention.

FIG. 4 shows a timing diagram comprising a digital trigger signal comprising an ID during period t0, and a subsequent analog signal from the sensor with matching ID during period t1. Since the signal which is a measure for the measured external parameter is an analog signal, the analog signal must only have a duration which is long enough for determining an amplitude of the analog signal which is representative for the measured external parameter.

In embodiments of the present invention a time multiplexed sequence of analog signals may be applied by the output buffer. In that case the predefined period may be equal to or larger than the minimum duration for one analog signal times the number of analog signals which are transmitted after receiving the matching trigger signal.

The required duration for one analog signal may for example be between 1 µs and 100 µs, or between 1 µs and 1 ms for example 10 µs, or 20 µs. This is typically shorter than the time required for digitally transmitting a digital value according to a digital protocol, since in that case the bits of the digital value must be transmitted sequentially and the full digital frame, as well as an optional cyclic redundancy check (CRC) data frame, needs to be received such that the digital value can be decoded according to the digital protocol. Also, a sync signal must be transmitted before transmitting the digital bits. Moreover, if an analog signal is obtained by the sensor element, an A/D conversion is not necessarily required for transmitting the signal. Note that in some implementations an A/D conversion may be followed by a D/A conversion.

In case of a time multiplexed sequence of analog signals, the multiplexed signals may for example be a combination of the following:

An analog voltage indicative of sensor fault, e.g. first level is indicative of good working condition, while a second level indicates a fault. Different levels may be used to report specific faults.

Another Sensor Value (e.g. Temperature from Temperature Sensor)

A voltage reference for scaling the main measurement value.

Figure 5:
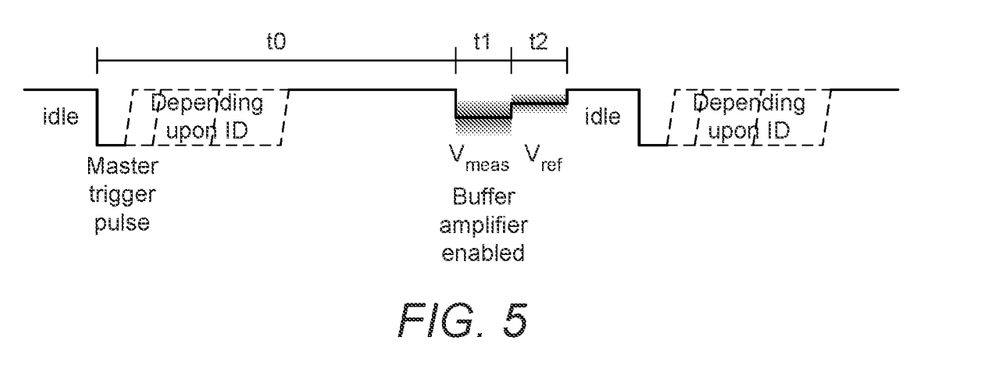
FIG. 5 shows a timing diagram comprising a digital trigger signal comprising an ID and a subsequent sequence of two time multiplexed analog signals from the sensor with matching ID, in accordance with embodiments of the present invention.

In embodiments of the present invention more than one analog value may be time multiplexed on the sensor terminal 114. An example thereof is illustrated in FIG. 5 wherein a first analog value during period t1 is followed by a second analog value during period t2. In the example each analog value has a duration of 20 µs. The first analog value may for example be a measure for the Bz component of a Hall sensor and the second analog value may for example be a measure for the Bx,y component of the Hall sensor.

In some embodiments of the present invention the analog signal may be a ratiometric output. The ratiometric output may be referred to an external voltage, for example the supply voltage.

In some embodiments of the present invention the analog output signal is referred to an internal (voltage) reference of the sensor, i.e. it is not ratiometric to the power supply. In that case the reference voltage may be time multiplexed as well as an additional analog value (see for example the reference voltage in FIG. 5). The internal voltage reference is typically lower than the supply voltage and substantially insensitive to power supply fluctuations. An advantage of this configuration is that the output signal is less sensitive to power supply fluctuations.

Figure 6:
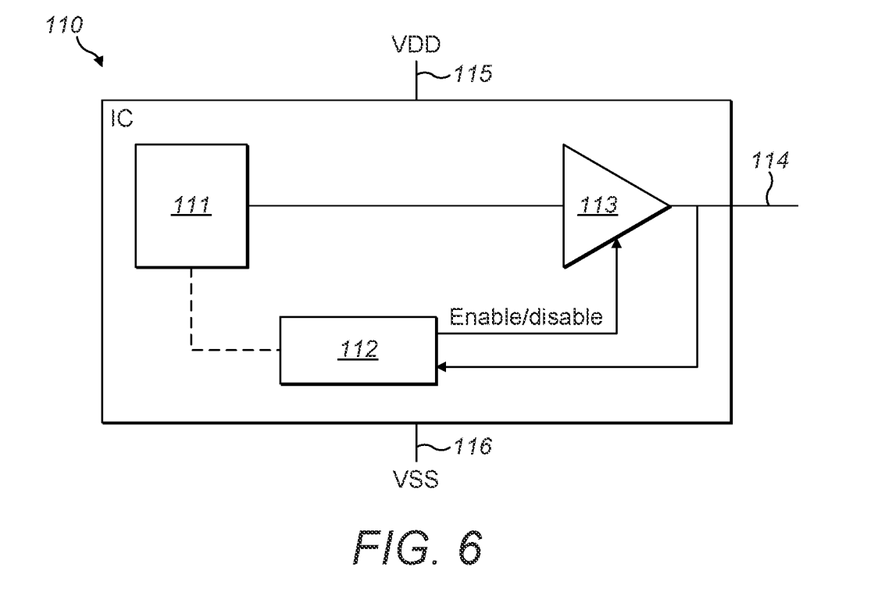
FIG. 6 shows a schematic drawing of a sensor in accordance with embodiments of the present invention.

FIG. 6 shows a schematic drawing of a sensor 110 in accordance with embodiments of the present invention. The sensor comprises a control circuit 112 which is connected with the sensor terminal 114 and an output buffer 113 which is also connected with the sensor terminal 114. In a sensor system 100 according to embodiments of the present invention this sensor terminal 114 is connected with the ECU 120. In this exemplary embodiment both the analog output of the output buffer and the digital signal from the ECU are transmitted over the sensor terminal 114. The control circuit is configured for receiving the trigger signal from the sensor terminal, and for determining whether the trigger signal matches the ID of the sensor. Through a disable signal the control circuit can put the output of the output buffer 113 in a high impedance state (high-Z). The control circuit is configured for enabling the output buffer 113 during a predefined period when the trigger signal matches the ID of the sensor. In FIG. 6 the sensor is powered via power terminals 115, 116.

In FIG. 6 the sensor element 111 is directly connected with the output buffer 113. In such an embodiment the measurement result of the sensor element may be an analog value which is passed to the output buffer 113. Besides controlling the output buffer, the control circuit 112 may also be configured for controlling the sensor element such that the sensor element is only actively measuring when a matching trigger signal is received. This may for example be done to reduce the power consumption of the sensor 110. The control circuit 112 may also be configured for controlling the sensor element to obtain a measurement when a trigger signal is received, such as to precisely time the moment at which the physical quantity is measured. For doing so the control circuit is electrically connected with the sensor element. In FIG. 6 this is indicated with a dashed line to indicate that this is an optional connection. In alternative embodiments the sensor element may for example be continuously measuring. In this case, the sensor may be timed based on an internal clock, which is asynchronous with respect to the ECU clock.

Figure 7:
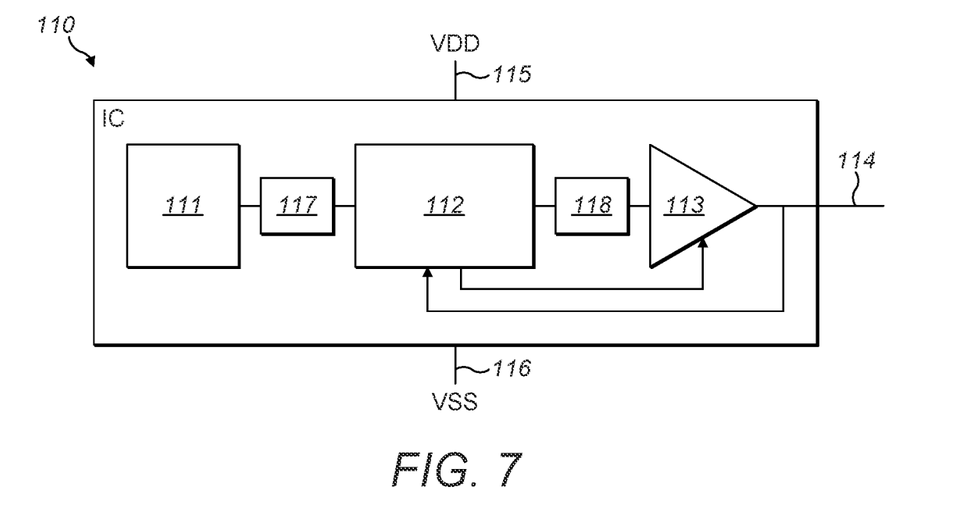
FIG. 7 shows a schematic drawing of a sensor in accordance with embodiments of the present invention wherein the measurement result is AD converted, processed, and DA converted.
Figure 8:
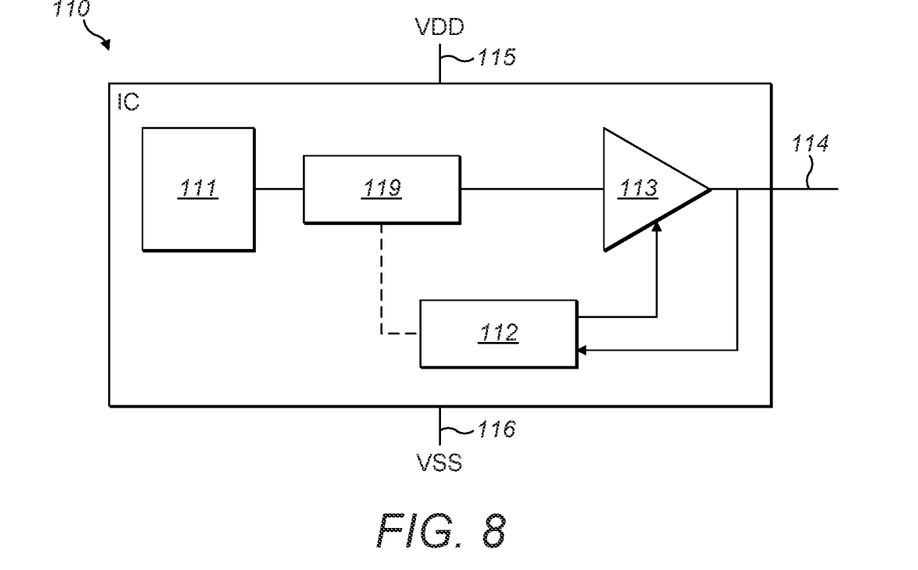
FIG. 8 shows a schematic drawing of a sensor comprising a signal processing circuit in accordance with embodiments of the present invention.

In FIG. 7 the sensor element 111, which is configured for measuring an external parameter is connected with an ADC 117. The output result of the sensor element is A/D converted b the ADC and may be further processed by the control circuit 112 which is connected with the output of the ADC 117. The control circuit 112 is connected with the input of a DAC 118 which is configured for D/A converting the processed result. The output of the DAC is connected with the input of the output buffer 113. Thus an analog value of the processed result is passed to the output buffer 113. As discussed earlier this output buffer is only enabled during a predefined period, and only if the trigger signal matches the ID of the sensor. This trigger signal is received by the control circuit over the connection with the sensor terminal 114.

In embodiments of the present invention the sensor 110 may comprise a signal processing circuit 119 configured for analog processing of the result of the sensor element 111. An example thereof is shown in the schematic drawing in FIG. 8 of a sensor 110 in accordance with embodiments of the present invention. The output of the sensor element 111 is connected with the input of the signal processing circuit 119. The output of the signal processing circuit is connected with the output buffer 113. In this example the main signal processing chain is a fully analog processing chain. In this example the control circuit 112 is not processing the result from the sensor element 111. The control circuit 112 is connected with the sensor terminal 114 for receiving the trigger signal. When receiving a trigger signal with matching ID, the control circuit 112 will enable the output buffer 113. Optionally the control circuit may also enable the processing circuit 119, and this only during a predefined period after receiving the trigger signal with matching ID. Thus, the power consumption of the sensor 110 may be reduced compared to a sensor where the processing circuit is continuously on.

Figure 9:
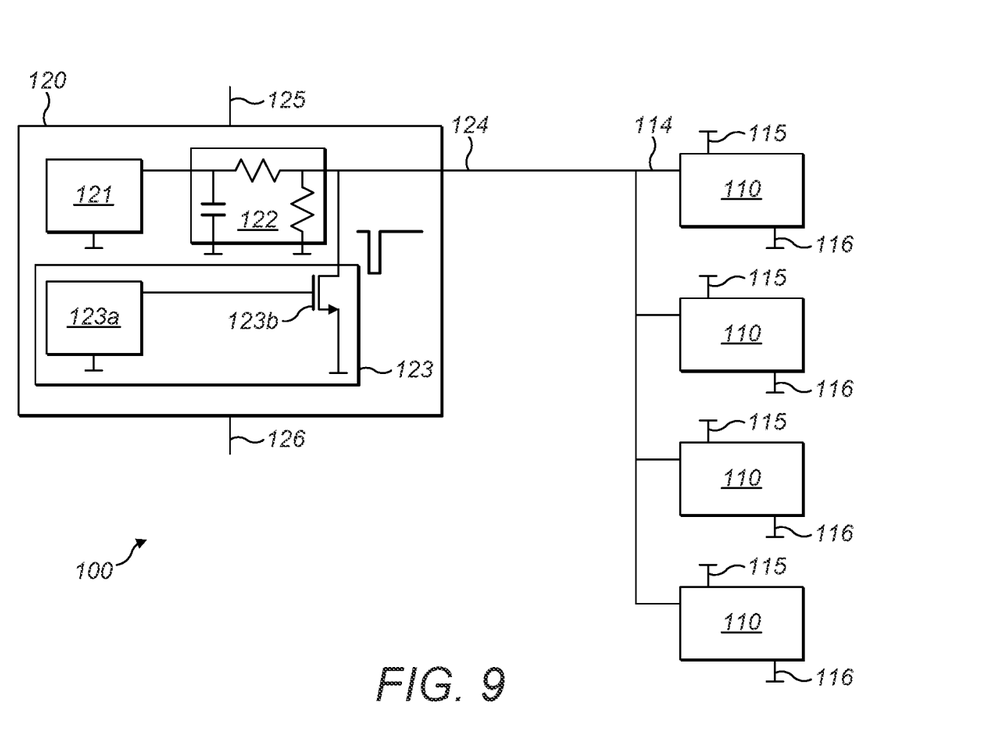
FIG. 9 shows a schematic drawing of a sensor system, schematically illustrating exemplary analog input circuitry and exemplary trigger circuitry of an ECU, in accordance with embodiments of the present invention.

FIG. 9 shows a schematic drawing of a possible implementation of analog input circuitry 121, 122 and of trigger circuitry 123 of an ECU 120 in accordance with embodiments of the present invention. FIG. 9 also shows a schematic drawing of a sensor system 100 comprising a plurality of sensors 110 and an ECU 120, in accordance with embodiments of the present invention. In FIG. 9 node 124 of the ECU 120 is connected with the sensor terminals 114 of the sensors. The node 124 is connected with a filter 122 which is connected with the analog input 121 of the ECU 120. The node 124 is also connected with the trigger circuit 123. The trigger circuit 123 comprises in this example a pulse with modulator 123a which is connected with the gate of a transistor 123b. The transistor 123b is connected with its source and drain between the ground and the node 124. Thus, a trigger signal can be applied to the node 124.

Figure 10:
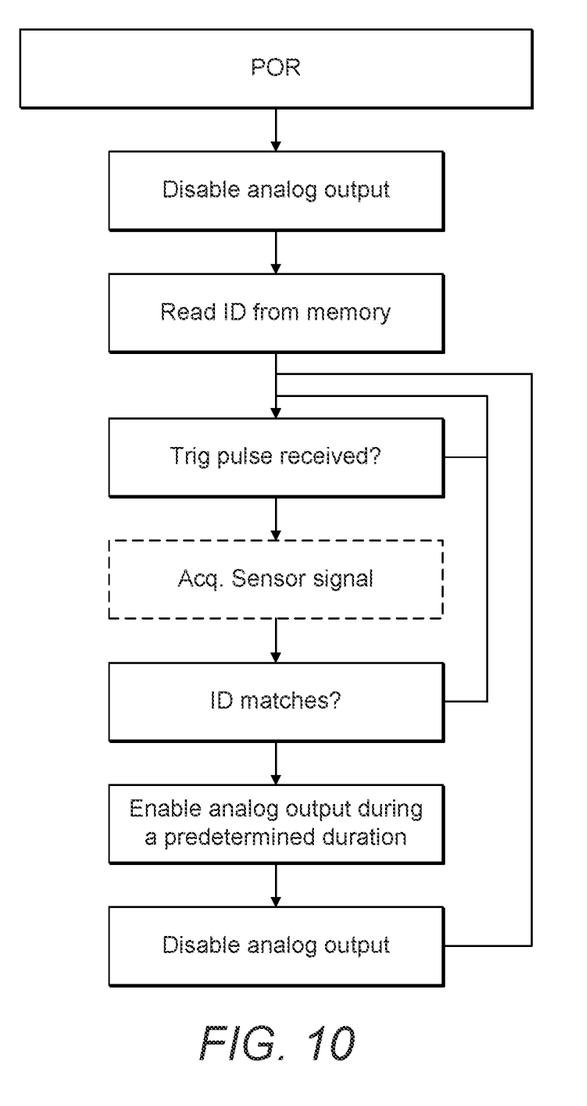
FIG. 10 shows an exemplary flow chart of a method implemented by a control circuit of a sensor in accordance with embodiments of the present invention.

FIG. 10 shows an exemplary flow chart of a method implemented by a control circuit 112 of a sensor 110 in accordance with embodiments of the present invention. The control circuit may for example be implemented as an application specific integrated circuit (ASIC) or field programmable gate array (FPGA). After a power on reset (POR) the control circuit 112 disables the analog output and reads an ID from memory. The control circuit monitors the sensor terminal for a trigger signal. Once a trigger signal is received the control circuit may, optionally, trigger the sensor element and/or the signal processing circuit for acquiring a measurement result. This is, however, not strictly required. The sensor may also be configured for continuously measuring the external parameter.

If the trigger signal does not match with the ID of the sensor, the control circuit continuous monitoring the sensor terminal for a trigger signal.

If the trigger signal matches with the ID of the sensor the analog output is enabled during a predetermined duration, after which the output is disable again, and the control circuit continuous monitoring the sensor terminal for a trigger signal.

In a sensor system according to embodiments of the present invention all sensors on the bus may be configured for measuring simultaneously. The sensors may for example be configured for doing a measurement when a first trigger signal is received, or for doing a measurement when a specific trigger signal for triggering a measurement is received. In embodiments of the present invention the specific trigger signal is sensor independent. The specific trigger signal may for example address all sensors simultaneously for doing a measurement (the trigger signal may for example have a specific measurement ID which does not correspond to a sensor). Once having done the measurement the sensors then separately apply the analog result one after the other when the trigger signal matches the ID of the sensor. In embodiments of the present invention the sensors are configured for not doing a new measurement, or for doing a new measurement, but not applying this value on the output, before all measurements are transmitted. An advantage is that the physical quantity is measured at the same time (when the first trigger signal, or a specific trigger signal for measuring only, was received) by the different analog sensors.

A sensor in accordance with embodiments of the present invention may be implemented as an integrated circuit. A plurality of these sensors may be implemented in a single package. These sensor terminals are connected with the output buffers of the sensors. It is thereby advantageous that the number of I/O pins can be reduced since the sensor terminals, connected with the analog outputs of the output buffers, of the different sensors can be connected together.

The invention claimed is:

1. A sensor, the sensor comprising power supply terminals for connecting a power supply for powering the sensor, at least one sensor element configured for measuring an external parameter and outputting one or more results representative for the external parameter, an output buffer configured for receiving the one or more results or a processed version thereof and for applying an analog signal representative for the result or a time multiplexed sequence of analog signals representative for the results on a sensor terminal, and a control circuit configured for obtaining an ID of the sensor, and for receiving a trigger signal, and for determining whether the trigger signal matches the ID of the sensor, and for enabling the output buffer during a predefined period when the trigger signal matches the ID of the sensor.

2. The sensor according to claim 1, wherein the control circuit is configured for determining whether the trigger signal matches the ID of the sensor by comparing a duration of the trigger signal with the ID.

3. The sensor according to claim 1, wherein the control circuit is configured for determining whether the trigger signal matches the ID of the sensor by comparing a number of pulses of the trigger signal with the ID.

4. The sensor according to claim 1, wherein the control circuit is configured for determining whether the trigger signal matches the ID of the sensor by counting the trigger signals thus obtaining a count number and by comparing the count number with the ID.

5. The sensor according to claim 1, the sensor comprising a signal processing circuit configured for analog processing of the result of the sensor element before directly or indirectly passing it to the output buffer.

6. The sensor according to claim 5, wherein the control circuit is configured for enabling the signal processing circuit when the trigger signal is received and/or when the trigger signal matches the ID of the sensor.

7. The sensor according to claim 1, wherein the control circuit is configured for triggering the sensor element for measuring the external parameter when the trigger signal is received and/or when the trigger signal matches the ID of the sensor.

8. The sensor according to claim 1, wherein the control circuit is configured for triggering the sensor element for measuring the external parameter when a specific trigger signal for triggering a measurement is received.

9. The sensor according to claim 8, wherein the specific trigger signal is sensor independent.

10. The sensor according to claim 1, the sensor comprising a digital to analog converter, and an analog to digital converter wherein the analog to digital converter (117) is configured for digitizing the result of the sensor element and for passing the digitized result to the control circuit, and wherein the control circuit is configured for processing the digitized result and for passing the processed digitized result to the digital to analog converter of which the output is directly or indirectly connected with the output buffer.

11. The sensor according to claim 1, wherein the control circuit is configured for obtaining the trigger signal from the sensor terminal.

12. The sensor according to claim 1, wherein the control circuit is configured for obtaining the trigger signal from one or from both of the power supply terminals.

13. A sensor system comprising a plurality of sensors according to claim 1, and an electronic control unit the electronic control unit comprising power supply terminals, a trigger circuit electrically connected with control circuits of the plurality of sensors, an analog input electrically connected with output buffers of the plurality of sensors, wherein the trigger circuit is configured for separately generating a trigger signal for one or more sensors of the plurality of sensors, and wherein the analog input is configured for receiving an analog signal from the output buffers of the plurality of sensors, wherein the analog signal is applied by the sensor of the plurality of sensors for which the trigger signal matches the ID of the sensor and wherein the output buffers are electrically connected together.

14. The sensor system according to claim 13, wherein the control circuits are configured for obtaining the trigger signal from the sensor terminal; and
wherein the trigger circuit and the analog input are connected with the control circuits and with the output buffers using a shared electrical connection.

15. The sensor system according to claim 13, wherein the control circuit is configured for obtaining the trigger signal from one or two of the power supply terminals; and
wherein the trigger circuit is electrically connected with the one or two power supply terminals of the electronic control unit, and wherein the one or two power supply terminals of the electronic control unit are electrically connected with power supply terminals of the plurality of sensors such that the trigger signal can be transmitted from the trigger circuit to the plurality of sensors.

* * * * *